(12) United States Patent
Tragesser et al.

(10) Patent No.: US 8,215,191 B2
(45) Date of Patent: Jul. 10, 2012

(54) CORN STALK STRENGTH MEASURING DEVICE

(75) Inventors: Scott Tragesser, Fort Wayne, IN (US); Rich Ketcham, Ames, IA (US)

(73) Assignee: Syngenta Participations AG, Basel (CH)

( * ) Notice: Subject to any disclaimer, the term of this patent is extended or adjusted under 35 U.S.C. 154(b) by 334 days.

(21) Appl. No.: 12/583,133

(22) Filed: Aug. 14, 2009

(65) Prior Publication Data

US 2010/0089178 A1 Apr. 15, 2010

Related U.S. Application Data

(60) Provisional application No. 61/088,929, filed on Aug. 14, 2008.

(51) Int. Cl.
*G01L 1/04* (2006.01)
(52) U.S. Cl. ..................... 73/862.627; 73/760
(58) Field of Classification Search ............. 73/760, 73/862.59, 862.627
See application file for complete search history.

(56) References Cited

U.S. PATENT DOCUMENTS

| 4,099,365 | A | * | 7/1978 | Hudson ................. 56/13.5 |
| 4,630,430 | A | * | 12/1986 | Weeks ................. 56/14.1 |
| 5,044,210 | A | * | 9/1991 | Kuhn et al. ............. 73/865.3 |
| 6,983,582 | B1 | * | 1/2006 | Muckler ................. 56/1 |
| 7,401,528 | B2 | * | 7/2008 | Deppermann et al. ..... 73/826 |
| 7,987,735 | B2 | * | 8/2011 | Mann et al. .......... 73/862.59 |

FOREIGN PATENT DOCUMENTS

WO WO 2007/149984 A2 * 12/2007
* cited by examiner

*Primary Examiner* — Max Noori
(74) *Attorney, Agent, or Firm* — Dana Rewoldt

(57) ABSTRACT

An apparatus for measuring stalk strength of a plant is disclosed. A force sensor is mounted to a harvester in a position to measure the resistance to crushing of the plant stalk by a stalk roll of the harvester. The apparatus may include a pair of counter rotating stalk rolls that pull and crush the plant stalk between them and a pair of stain gauges attached on either side of a mounting apparatus of the stalk rolls to sense both the tension and compression forces induced in the mounting apparatus by each of the rolls in response to the resistance to crushing of the plant stalk. Data collected by the invention can be advantageously used in a breeding program wherein breeding decisions are made based at least in part on stalk strength.

18 Claims, 23 Drawing Sheets

CORN STALK STRENGTH MEASURING DEVICE

CROSS REFERENCE TO RELATED APPLICATION

This application claims benefit of U.S. Provisional Application Ser. No. 61/088,929 filed Aug. 14, 2008 which is incorporated herein by reference in its entirety.

BACKGROUND OF THE INVENTION

The invention relates generally to crop harvesters and, more specifically, to a corn stalk strength measuring device mounted on a harvester for harvesting corn and methods for measuring corn stalk strength.

Stalk lodging in corn is the breakage of the corn stalk below the ear. Stalk lodging in corn results in increased harvest losses, slower harvest equipment speeds, increased drying cost and in most cases, a significant volunteer problem the following season. Yield losses from stalk lodging range from 5 to 25 percent nationwide. Root and stalk lodging are some of the most important traits in commercial maize breeding.

Causes of stalk lodging include the following. Plant population levels that are too high decrease the amount of light in the crop canopy and cause the corn plants to become tall and thin. The physical strength of the corn stalk under these conditions is significantly reduced. In addition, plant-to-plant competition for light, nutrients, and water enhances the competition for carbohydrates between the stalk and ear within the plant, thus reducing the vigor of the cells in the stalk and predisposing them to invasion by stalk rot. Extremes in soil moisture can increase the occurrence of stalk lodging. Excessive soil moisture retards root growth and development, leading to a less than optimum root system which cannot adequately support plant growth. On the other hand, droughty conditions stress the crop and enhance the development of stalk rot by reducing movement of sugars to the root system. Nutrient imbalances and/or deficiencies predispose corn plants to stalk rot and stalk lodging. For example, high nitrogen fertility levels coupled with low potassium levels enhance the potential for stalk rot. High nitrogen levels enhance lush vegetative growth, while low potassium levels increase the amount of premature stalk death. Together, these conditions produce an ideal situation for stalk rot and lodging. Conversely, low levels of soil nitrogen may result in less vigorous plants which put all their available energy into producing grain. This leaves the stalk vulnerable to stalk rot organisms and, ultimately, stalk lodging. Damage caused by the corn rootworm and the European corn borer can predispose the corn plant to invasion by stalk rotting organisms, as well as lead to outright yield loss. Corn rootworm larvae decrease the amount of water and nutrient uptake by feeding on the roots, whereas the European corn borer damages the stalk by feeding on the pith and the vascular tissue. In either situation, the corn plant is placed under physiological stress, which favors both stalk rot development and stalk lodging. These insects can also encourage the development of stalk rots by reducing the photosynthetic area of the plant, causing wounds through which pathogens enter stalks and roots, and carrying disease inoculum into tissues. Cultural practices which increase the amount of disease or insect pressure can also increase the amount of lodging that occurs in the corn crop. Leaving disease-infected corn stubble on the soil surface through reduced tillage methods can increase the incidence of stalk rot and stalk lodging in monoculture. Continuous cropping of corn also enhances the potential for insect problems such as European corn borer and corn rootworm.

One of the approaches to preventing stalk lodging is the development of commercial hybrid seed varieties with improved stalk strength. Currently, corn development programs commonly include selection of new corn varieties for advancement based at least in part on stalk strength. Stalk strength measurements can be taken of plants of the corn varieties at various times throughout the growing season, however, the most common practice is to count or estimate broken plants prior to harvest. Good expression of the stalk strength trait depends upon winds that are strong enough to break weak plants yet not so severe as to cause widespread, indiscriminant lodging on all plots. Instruments have been developed which measure resistance to penetration of the stalk. Since a person must walk through the plot of growing corn, conduct the measurement using the hand tool and record the measurement for each plant, it is a time-consuming and labor intensive process that can only be performed on a relatively small number of plots. There is a need, accordingly, for an automated apparatus and improved methods for taking stalk strength measurements on a large number of plots.

SUMMARY OF THE INVENTION

The invention consists of a stalk strength measuring device mounted on a corn harvester for measuring the strength of stalks of a variety of corn as they are being harvested by the harvester. In a particular embodiment, the device is mounted on a corn harvesting combine head including a pair of counter-rotating stalk rolls. Gathering chains of the header pull the corn stalks toward and into the stalk rolls which engage the stalks and pull them in between the rolls, crushing the stalks in the process. A strain gauge is mounted on each of the stalk rolls and provides an output signal proportional to the resistance to crushing of each stalk that passes through the stalk rolls. This signal is processed in a microprocessor using signal processing software to provide numerical value representative of stalk strength. The stalk strength measurements are recorded digitally and can be further analyzed for use in making decisions regarding use of the variety in a corn breeding program. The invention may also be used to detect gaps of missing plants in a row of a plot of corn plants by the absence of a signal over a given distance which could be measured by a GPS device, radar, optical shaft encoders and the like associated with the invention. It is also contemplated that the invention be used, again in association with a GPS device, radar, optical shaft encoders and the like to calculate a "fill ratio" representative of how uniformly corn plants are distributed in a plot harvested by a combine that includes the present invention.

In an alternative embodiment of the present invention, a laser beam is directed onto the stalk rolls, a sensor detects reflected laser light and changes in transit time is used to determine deflection of the stalk rolls in response to the crushing of stalks therebetween and therefore the resistance to crushing offered by the stalks.

In another alternative embodiment, a magnetic sensor, such as a Hall effect sensor, is mounted near the stalk rolls and measures deflection of the stalk rolls in response to the crushing of stalks therebetween and therefore the resistance to crushing offered by the stalks.

DESCRIPTION OF EMBODIMENTS OF THE INVENTION

Figure 1:
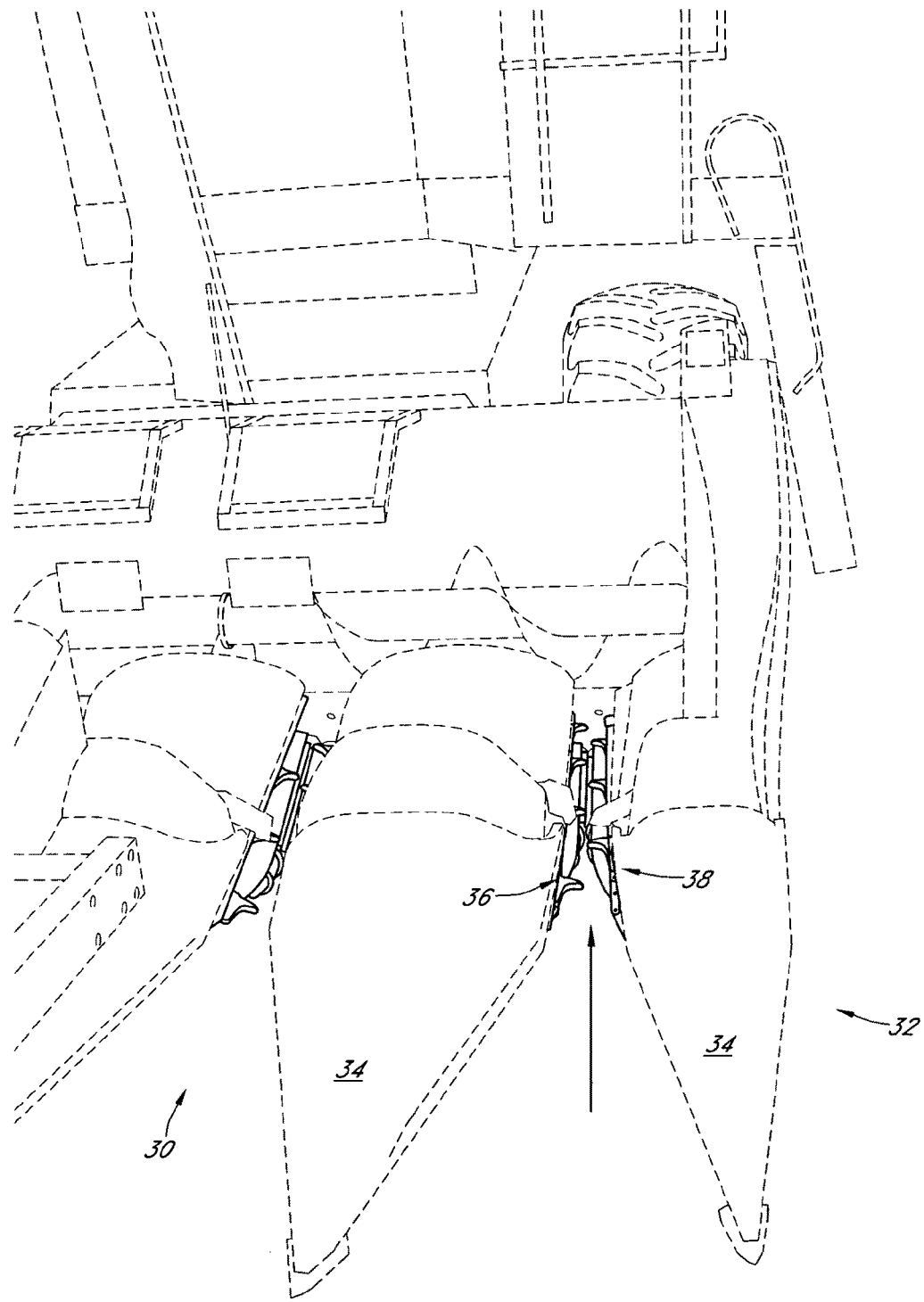
FIG. 1 is front view of a harvester for corn used with an embodiment of the present invention.
Figure 2:
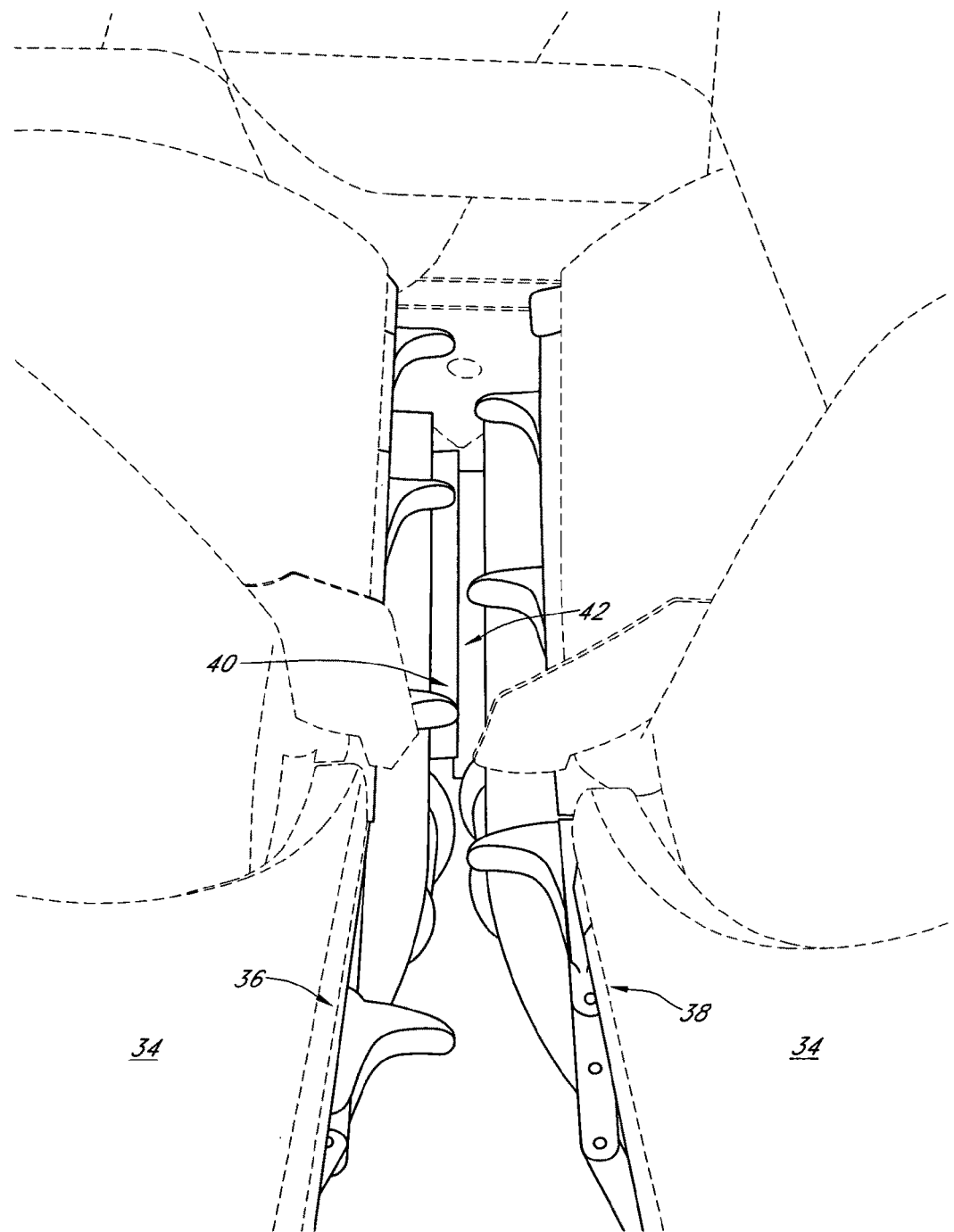
FIG. 2 is an enlarged view of the harvester of FIG. 1 and showing gathering chains and stalk rolls used with an embodiment of the present invention.
Figure 3:
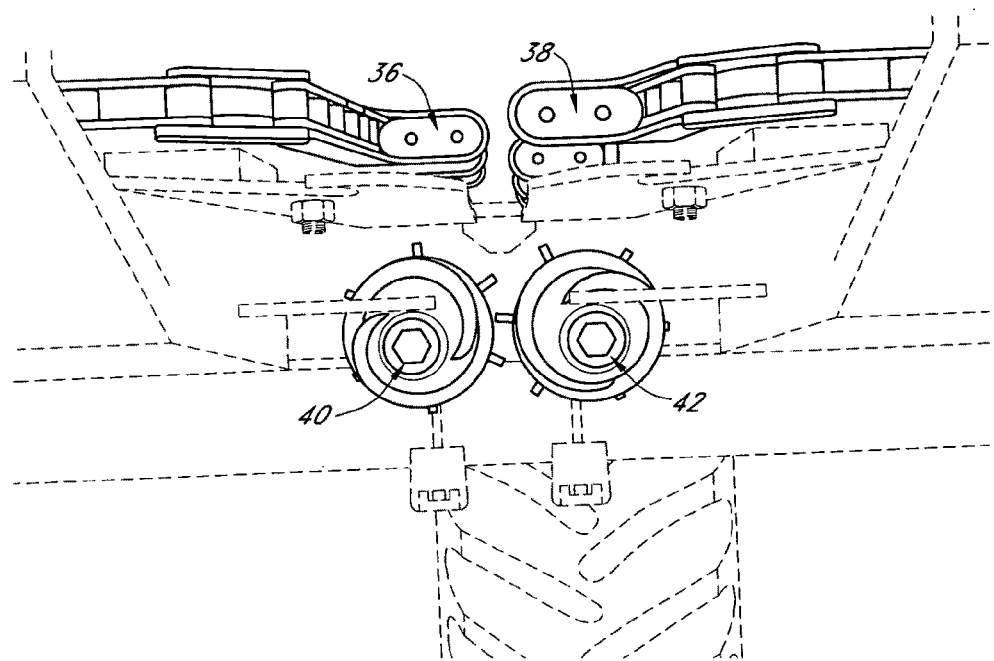
FIG. 3 is an enlarged view of the gathering chains and stalk rolls of FIG. 2 from a lower perspective.
Figure 4:
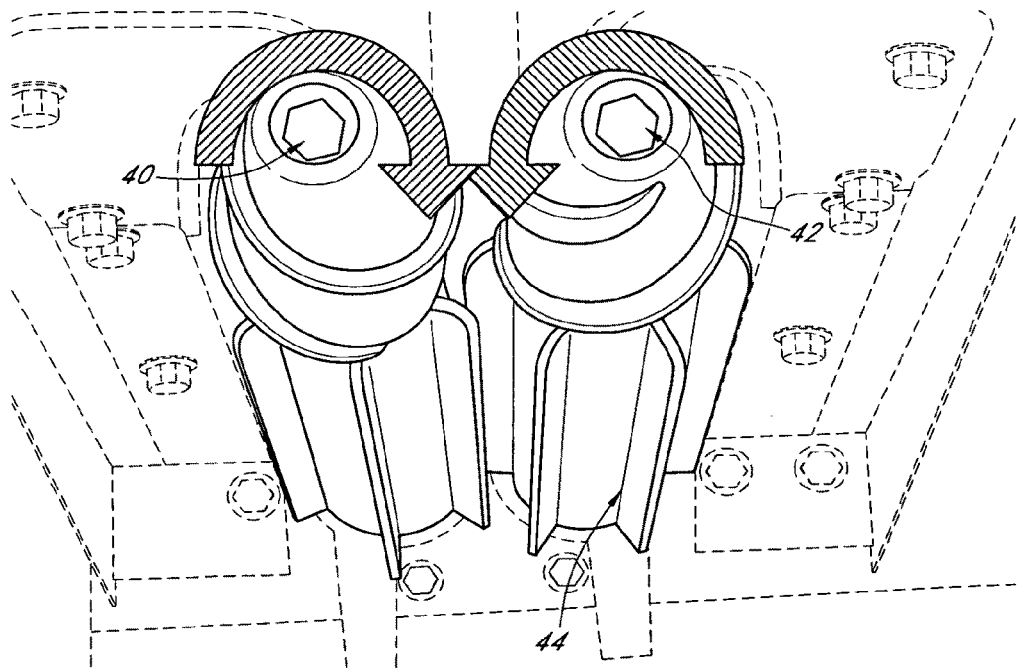
FIG. 4 is an enlarged view of the stalk rolls of FIGS. 2 and 3 from a lower perspective and with arrows indicating the respective counter rotation of the two stalk rolls.

Referring to FIG. 1, a harvester, indicated generally at 30, is shown, including a header 32 and a plurality of dividers 34. Corn stalks being harvested by the harvester 30 pass between adjacent pairs of the dividers 34 and are engaged by stalk gathering chains 36 and 38 that assist in moving the stalks into the harvester 30. The V-shaped channels marked by the arrow is the area where the corn plants meet the gathering chains and are gathered in and pulled downward by rotating stalk rolls. The gathering chains guide the stalks toward and into contact with the pair of counter-rotating stalk rolls 40 and 42 (FIGS. 2-4). The intact stalks are engaged by the stalk rolls 40, 42 and pulled rapidly downward therebetween, being assisted by a series of blades 44 of the stalk rolls 40, 42. FIG. 4 shows a close-up view of the underside of the stalk rolls. Stalks are drawn in by the spiral shaped stalk roll tips and then drawn downward by the blades on the stalk rolls. Stalks are crushed between these stalk rolls as they are drawn downward and the amount of resistance to crushing is a measure of ultimate stalk strength.

Figure 5:
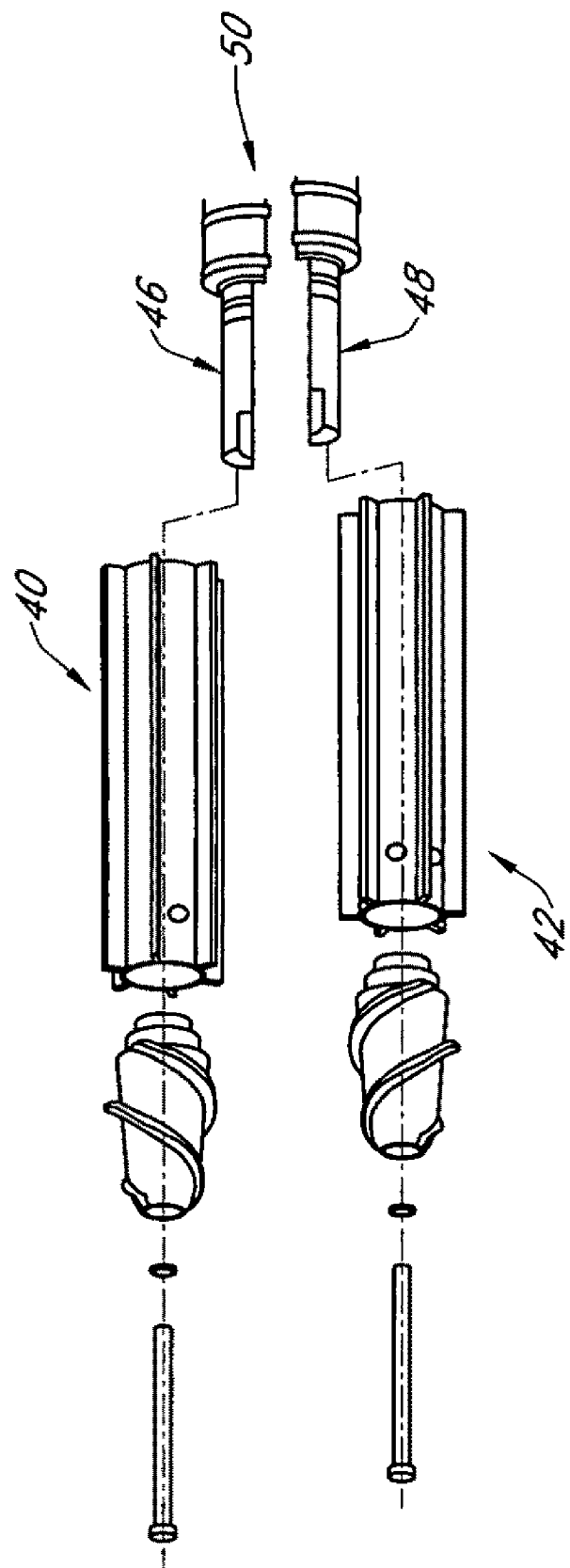
FIG. 5 is an exploded perspective view of the mounting of the stalk rolls.
Figure 6:
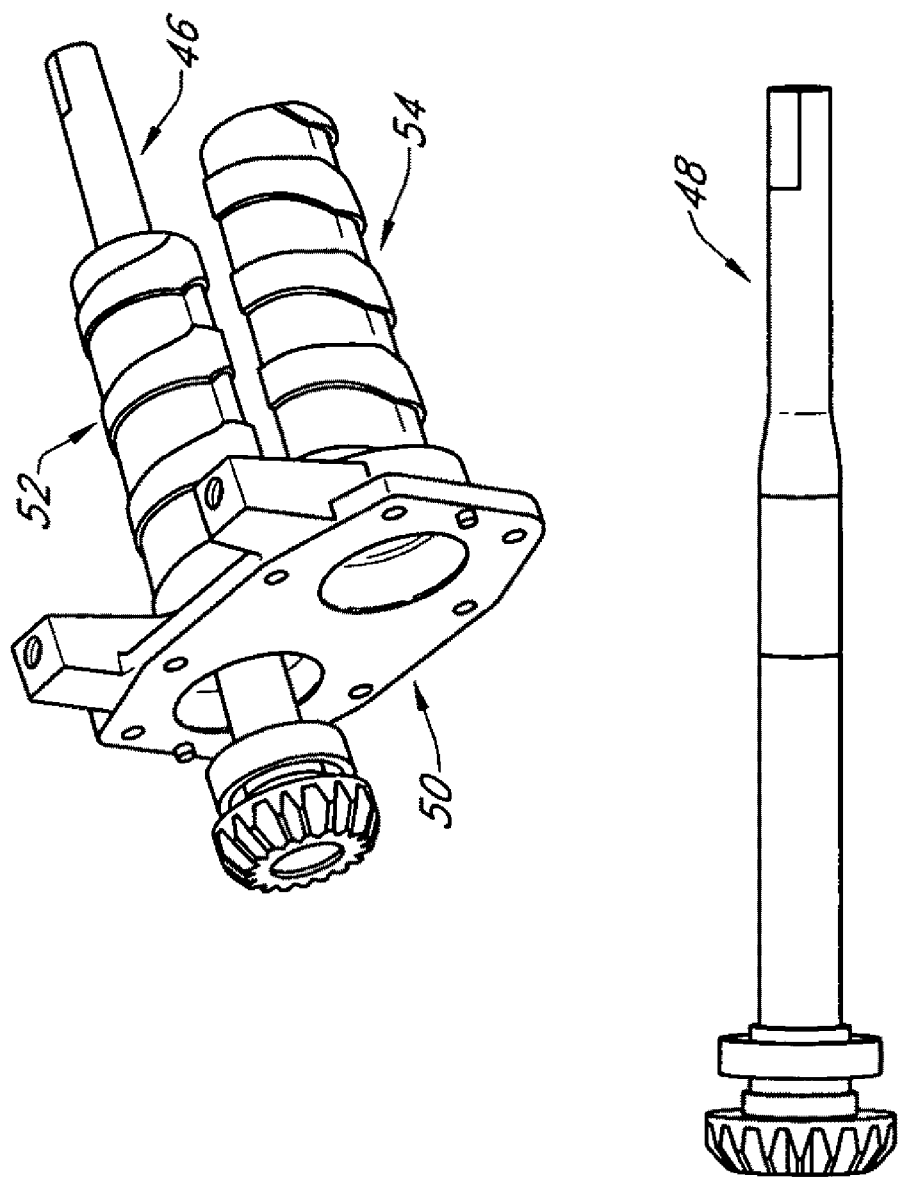
FIG. 6 is a view of the stalk roll drive shafts and drive shaft housing.
Figure 7:
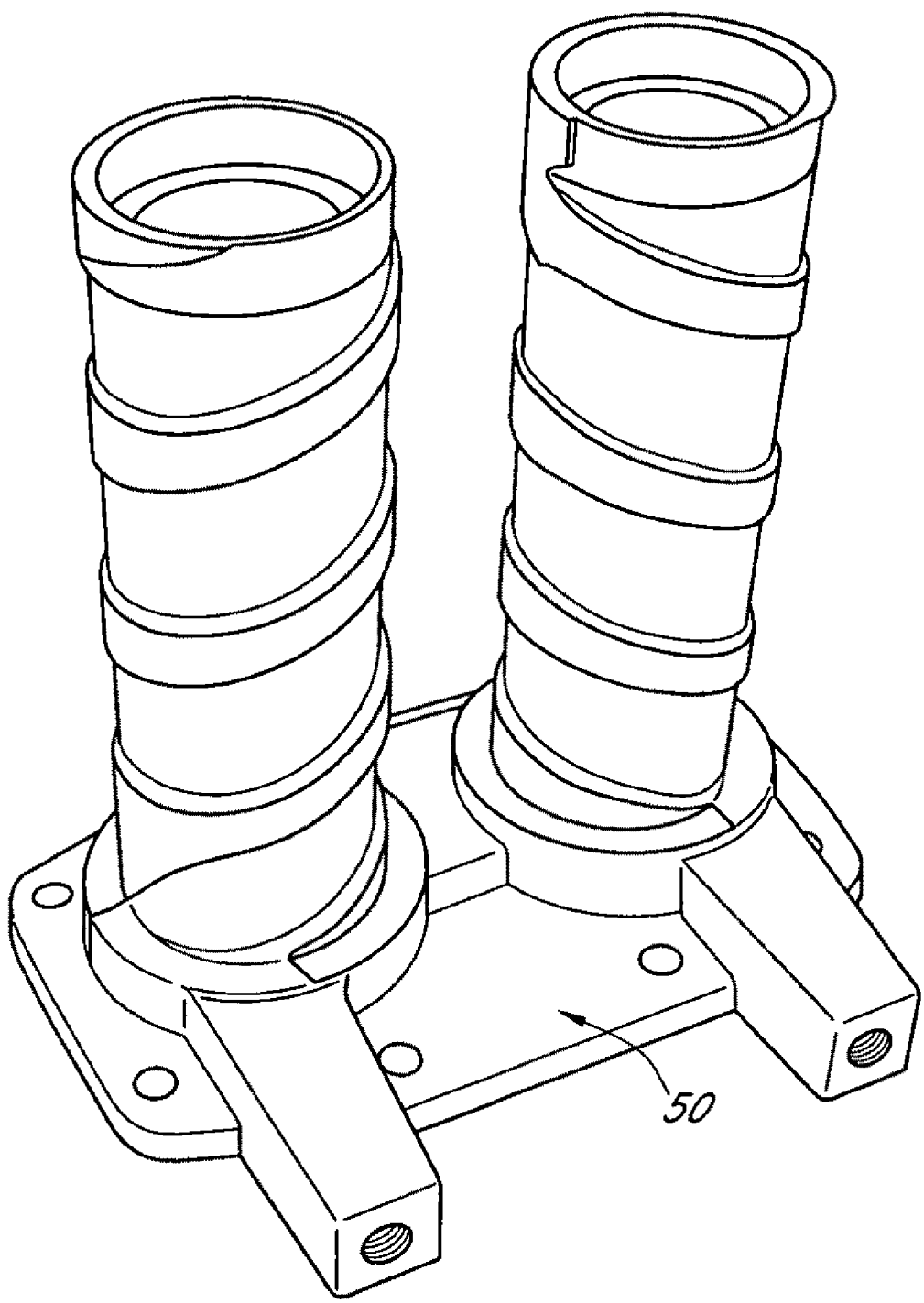
FIG. 7 is a perspective view of the drive shaft housing.

The stalk rolls 40, 42 are each rotated by a corresponding stalk roll drive shaft 46, 48 which themselves each rotate inside a stationary drive shaft housing 50, each journalled in a corresponding leg section 52, 54 of the housing 50 (FIGS. 5-7). The stalk rolls 40, 42 thus extend beyond the stationary drive shaft housing 50 but are functionally linked thereto by the drive shafts 46, 48 so that any non-longitudinal force exerted on the stalk rolls 40, 42 is transmitted to the stationary housing 50 via the drive shafts 46, 48. Accordingly, forces exerted on the stalk rolls 40, 42, can be measured by measuring the force on the stationary housing 50. More specifically, as the stalks are drawn through the stalk rolls 40, 42, the stalks are compressed by the stalk rolls 40, 42 that are spaced apart by a distance which will result in crushing of the stalks. The stalks, of course, resist crushing by an amount that is proportional to the stalk strength against crushing. This force is exerted on the stalk rolls 40, 42, in a direction tending to separate the stalk rolls 40, 42 or increase the distance between the stalk rolls 40, 42. Because of the transmission of this separation force to the drive housing 50 via the drive shafts 46, 48, a strain is placed on the drive housing 50 that is likewise in a direction tending to separate the housing leg sections 52, 54.

Figure 8:
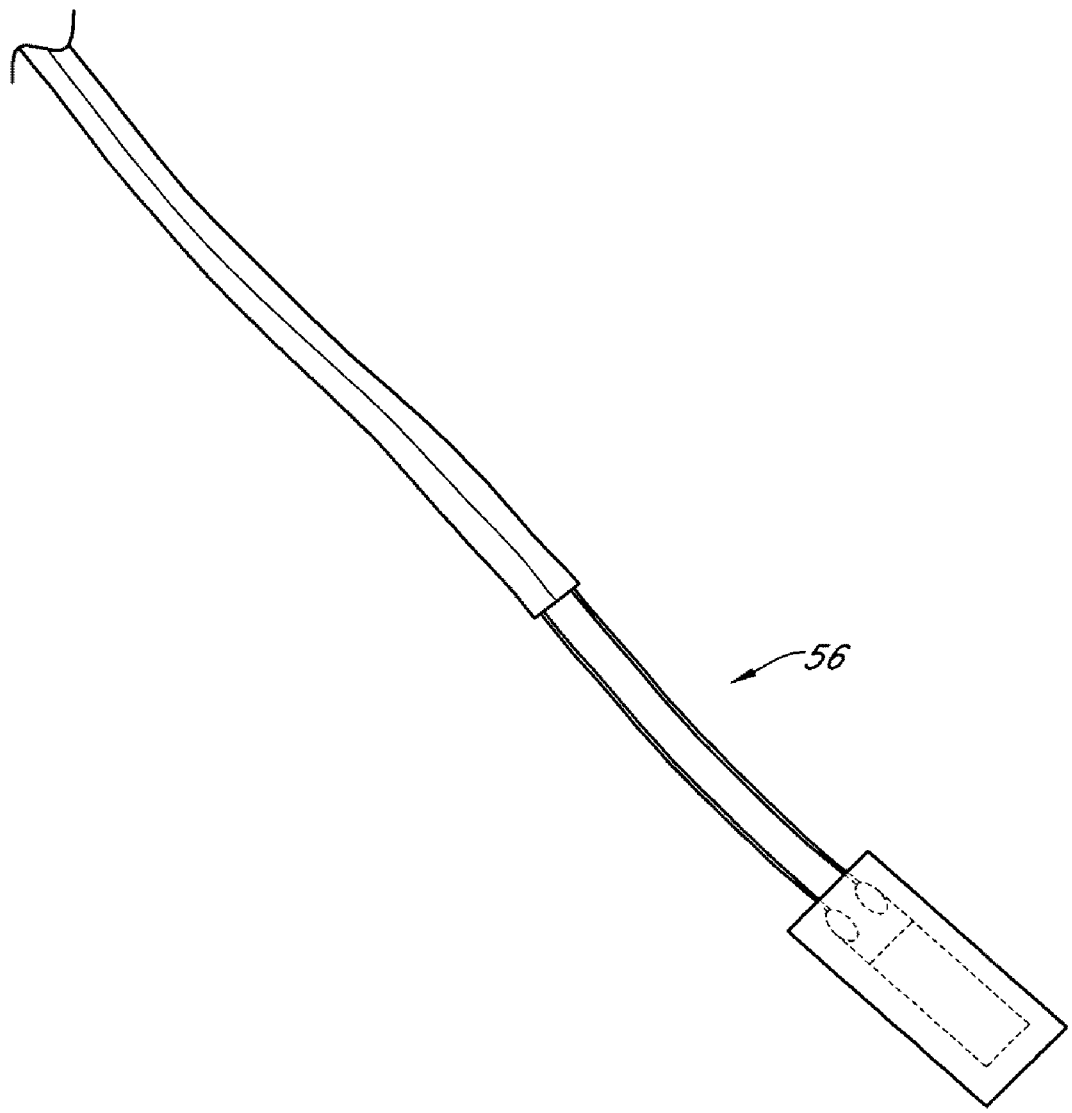
FIG. 8 is a plan view of a strain gauge for use in an embodiment of the present invention.
Figure 9:
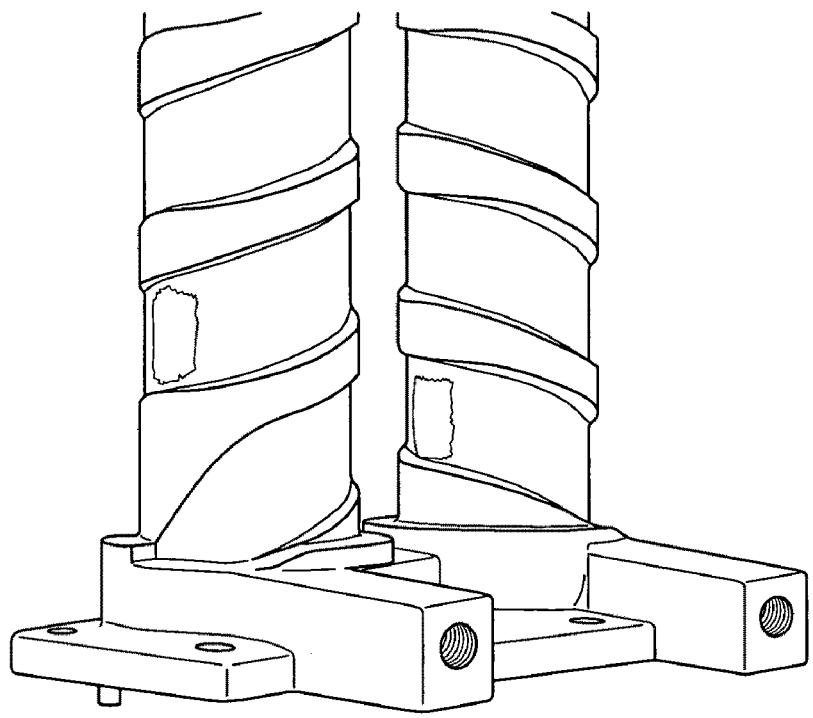
FIG. 9 is an enlarged view of the drive shaft housing showing where material has been removed to create a recess for mounting of the strain gauges.
Figure 10:
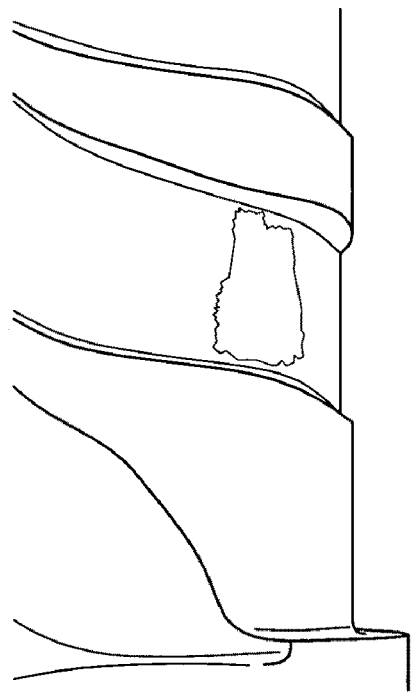
FIG. 10 is an enlarged view of a recess of FIG. 9.
Figure 11:
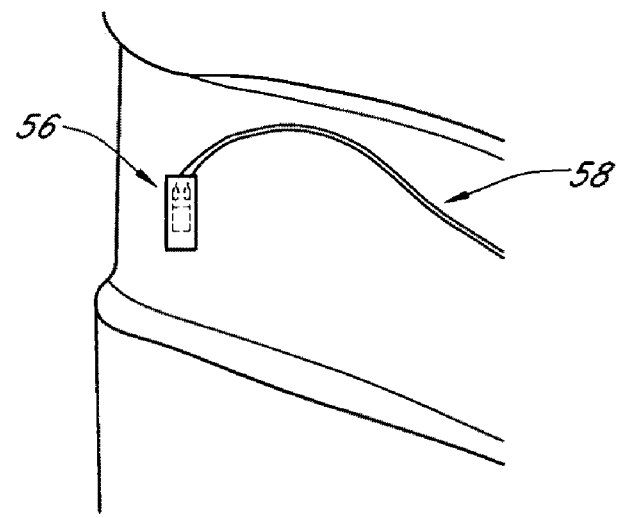
FIG. 11 is an enlarged view of a strain gauge mounted to the drive shaft housing in a recess therefor.
Figure 12:
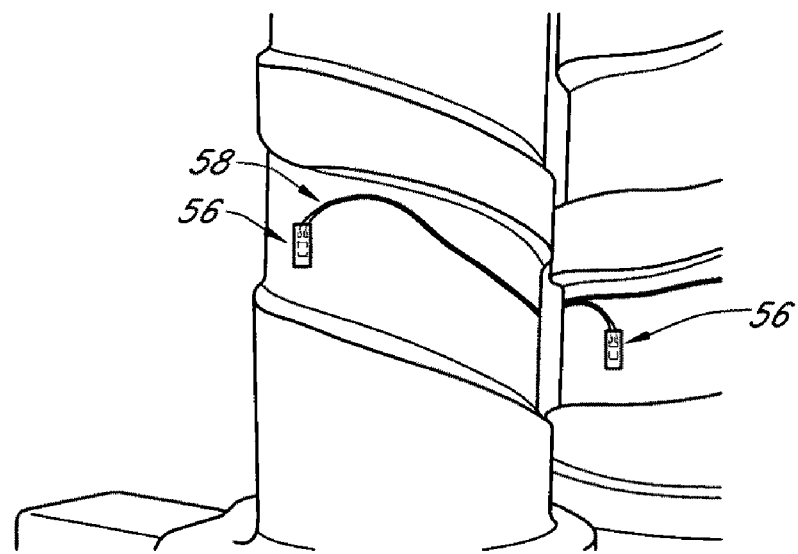
FIG. 12 is a reduced view of FIG. 11.
Figure 13:
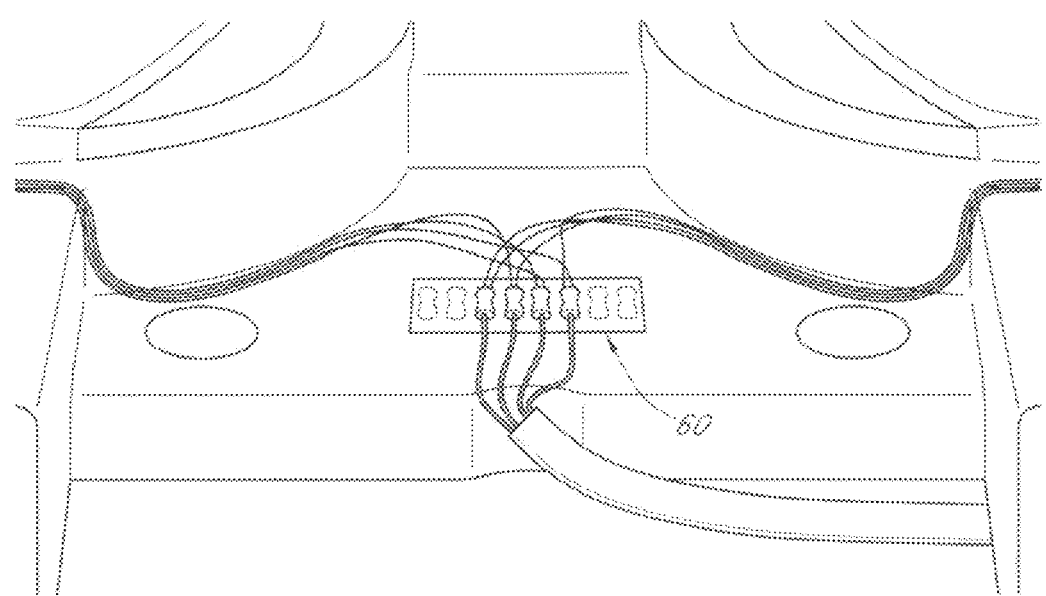
FIG. 13 is a view of a terminal block mounted on the base of the drive shaft housing.

The strain exerted on the housing 50 is measured, in the preferred embodiment, by four strain gauges, such as four of the strain gauge 56 shown in FIG. 8. The strain gauges 56 are mounted to points that will experience compression or tension when force is applied. The strain gages 56 are mounted on the inside and outside surface of each of the housing leg sections 52, 54. In the harvester 30 of the present invention, the housing leg sections 52, 54, have a raised spiral profile, leaving recesses or lands (FIGS. 9 and 10). In the preferred embodiment, the strain gauges 56 are mounted in the recesses so as to decrease the likelihood of damaging contact with stalks and other debris that moves between and past the leg sections 52, 54. Preferably, a mounting surface for each of the strain gauges is prepared by smoothing the surface of the leg section 52, 54 with a grinder or similar tool. A strain gauge 56 is attached to a corresponding mounting surface by epoxy or the like with the pair of wires 58 of each of the strain gauges 56 trailing through the recess toward the base of the housing 50 and also secured to the housing 50 by epoxy or the like (FIGS. 11 and 12). In the embodiment depicted in the drawings, the strain gauges 56 A terminal block 60 is mounted at the base of the housing 50 and the wires 58 are electrically connected to the terminal block 60 (FIGS. 13 and 14).

Figure 14:
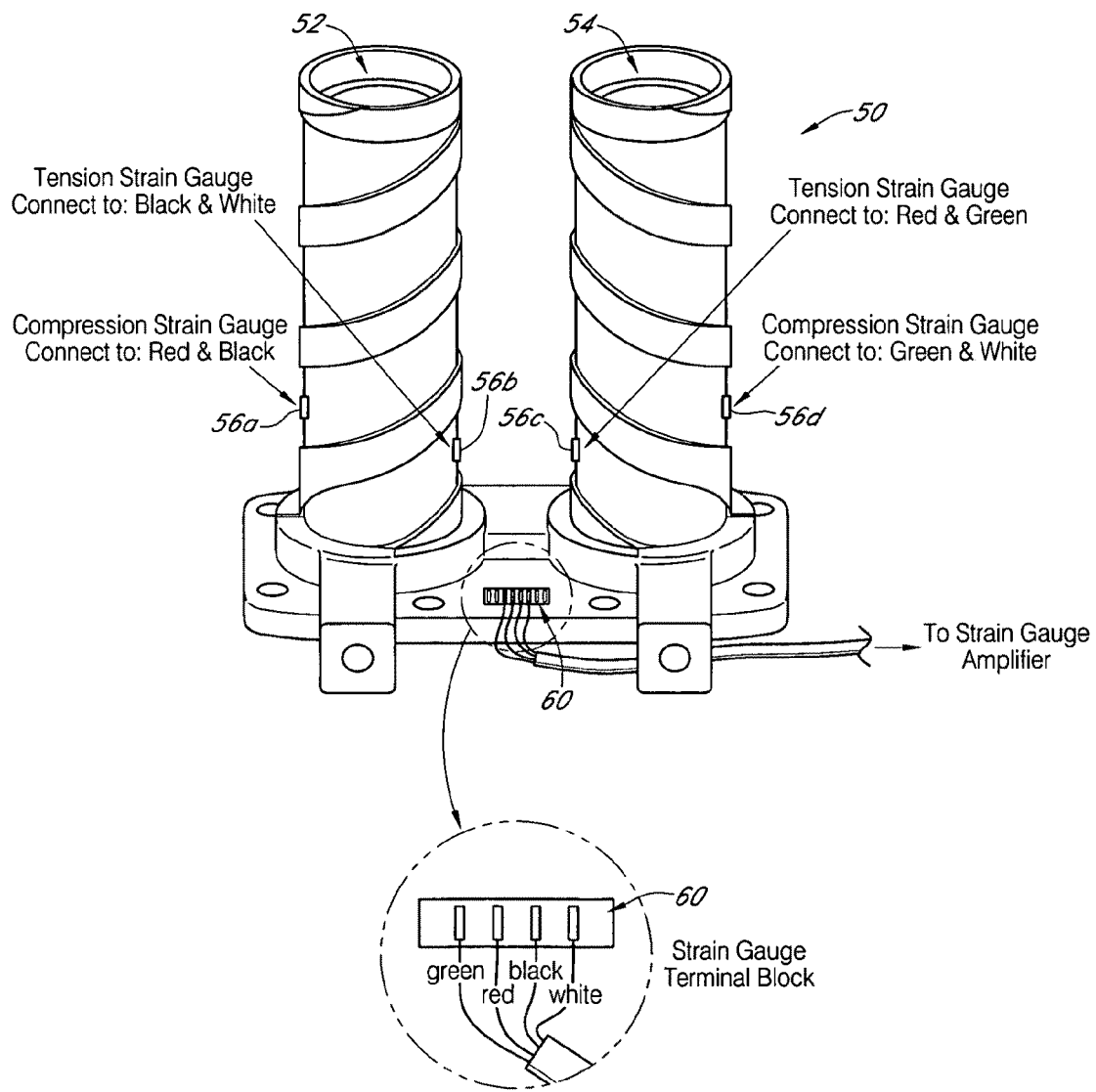
FIG. 14 is a view of the drive shaft housing showing the mounting of all strain gauges and the terminal block with an inset including an enlarged view of the wiring of the terminal block.
Figure 15:
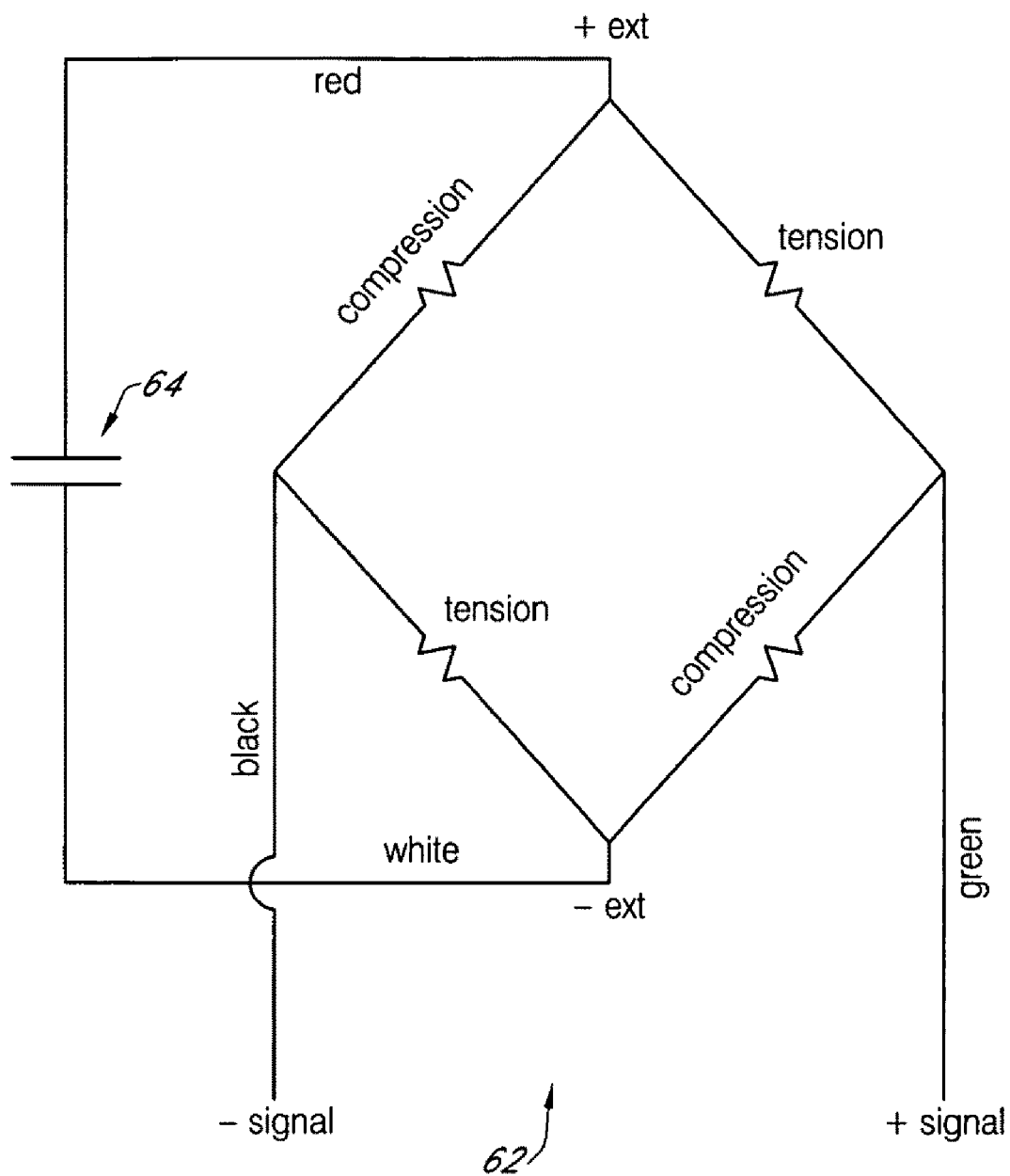
FIG. 15 is a circuit diagram of an embodiment of the present invention.
Figure 16:
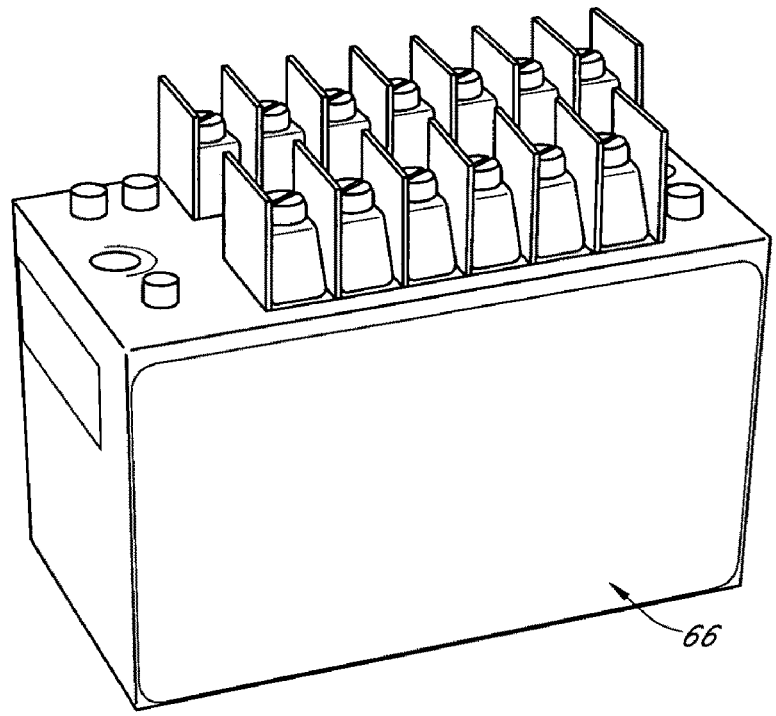
FIG. 16 is a photograph of a strain gauge amplifier of an embodiment of the present invention.
Figure 17:
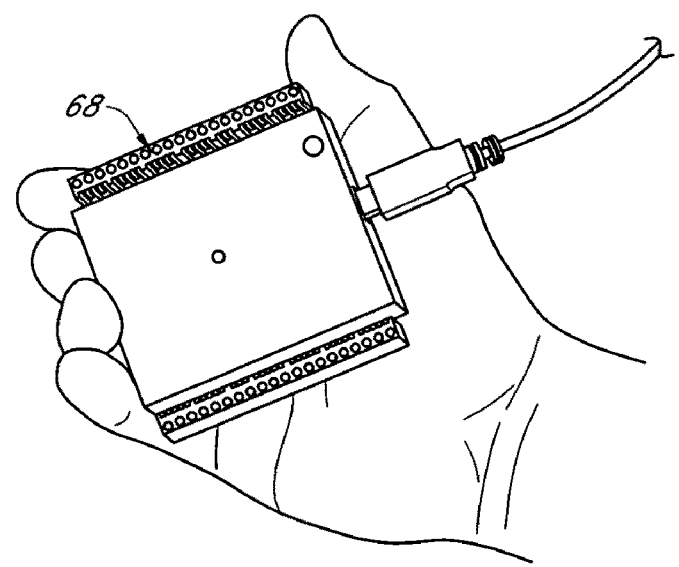
FIG. 17 is a photograph of a data acquisition module of an embodiment of the present invention.
Figure 18:
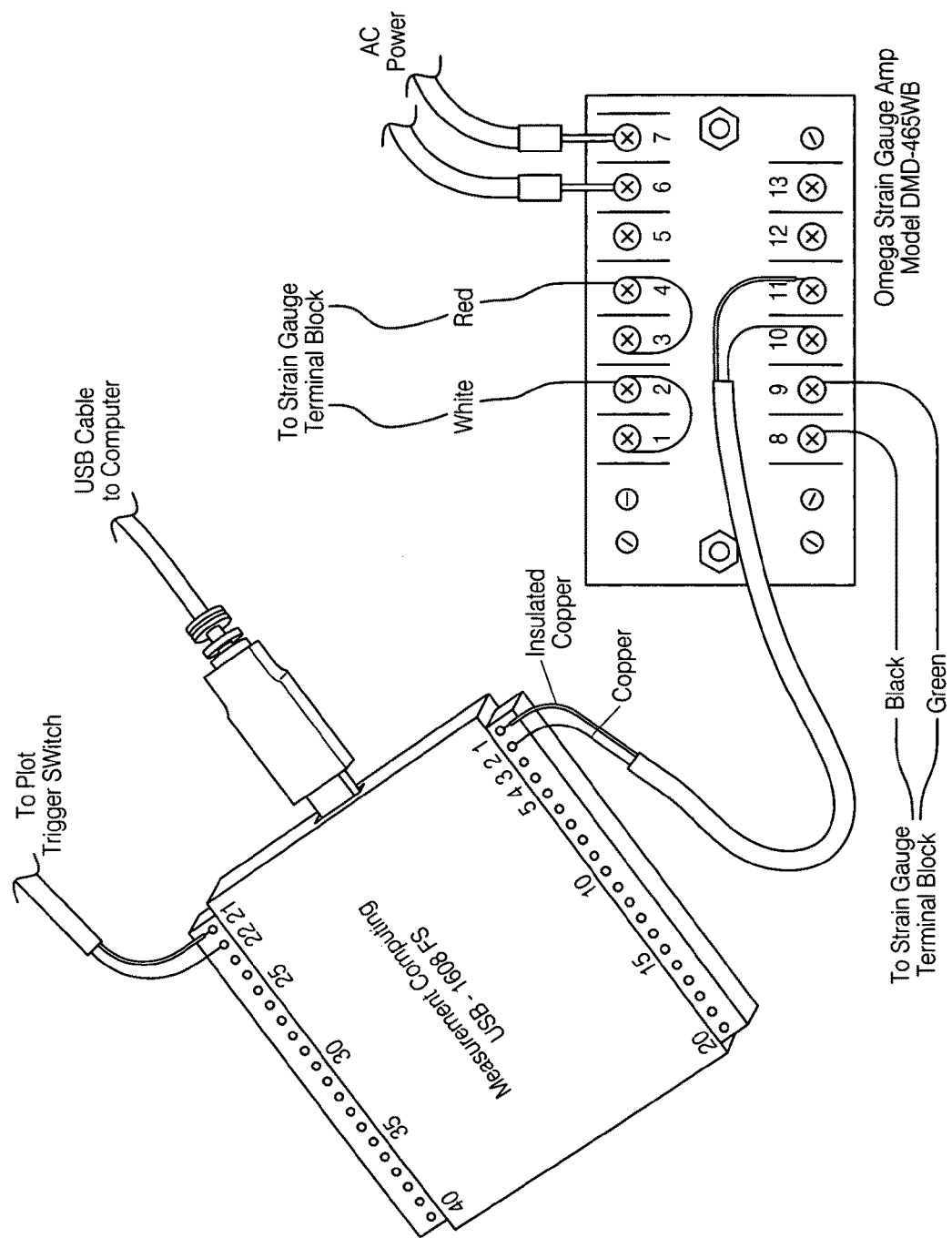
FIG. 18 is a drawing of a second circuit diagram of an embodiment of the present invention.

The four strain gauges 56a-d are located on either side of each of the leg sections 52, 54 (FIG. 14). Since the force exerted by the stalks against crushing by the rolls 40, 42 tends to increase the separation of the leg sections 52, 54, strain gauges 56a and 56d are placed in compression while strain gauges 56b and 56c are placed in tension. The lead wires 58 of the strain gauges 56 are wired as in the circuit 62 of the diagram of FIG. 15, including a capacitor 64. The output signals of the circuit 62 are connected to a strain gauge amplifier 66 (FIG. 16), which in one embodiment is an Omega Model DMD-465WB strain gauge amplifier. The amplified analog signal from the stain gauge amplifier 66 is converted into a digital signal by a data acquisition module 68 (FIG. 17), which in this embodiment is a Measurement Computing Model USB-1608FS data acquisition module, then relayed to a computer. A wiring diagram of the strain gauge amplifier 66 and data acquisition module 68 of the preferred embodiment is shown in FIG. 18.

Figure 19:
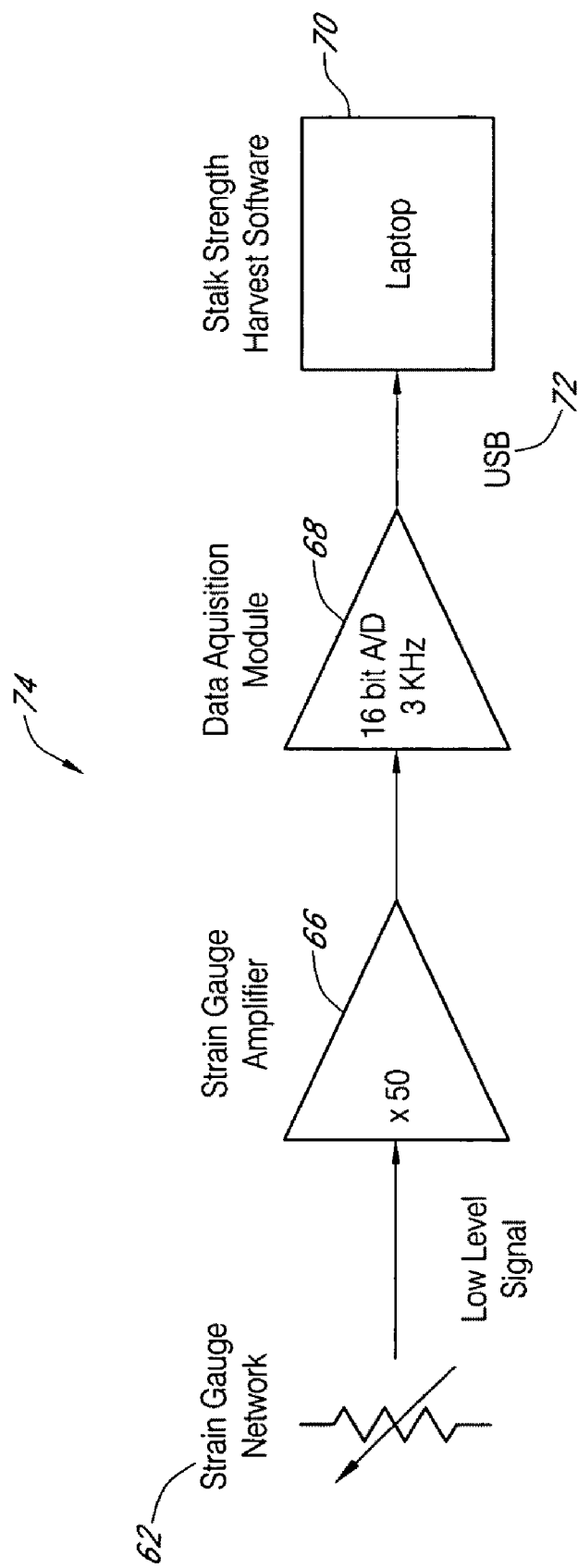
FIG. 19 is a flow chart of the data acquisition and signal processing components of an embodiment of the present invention.
Figure 20:
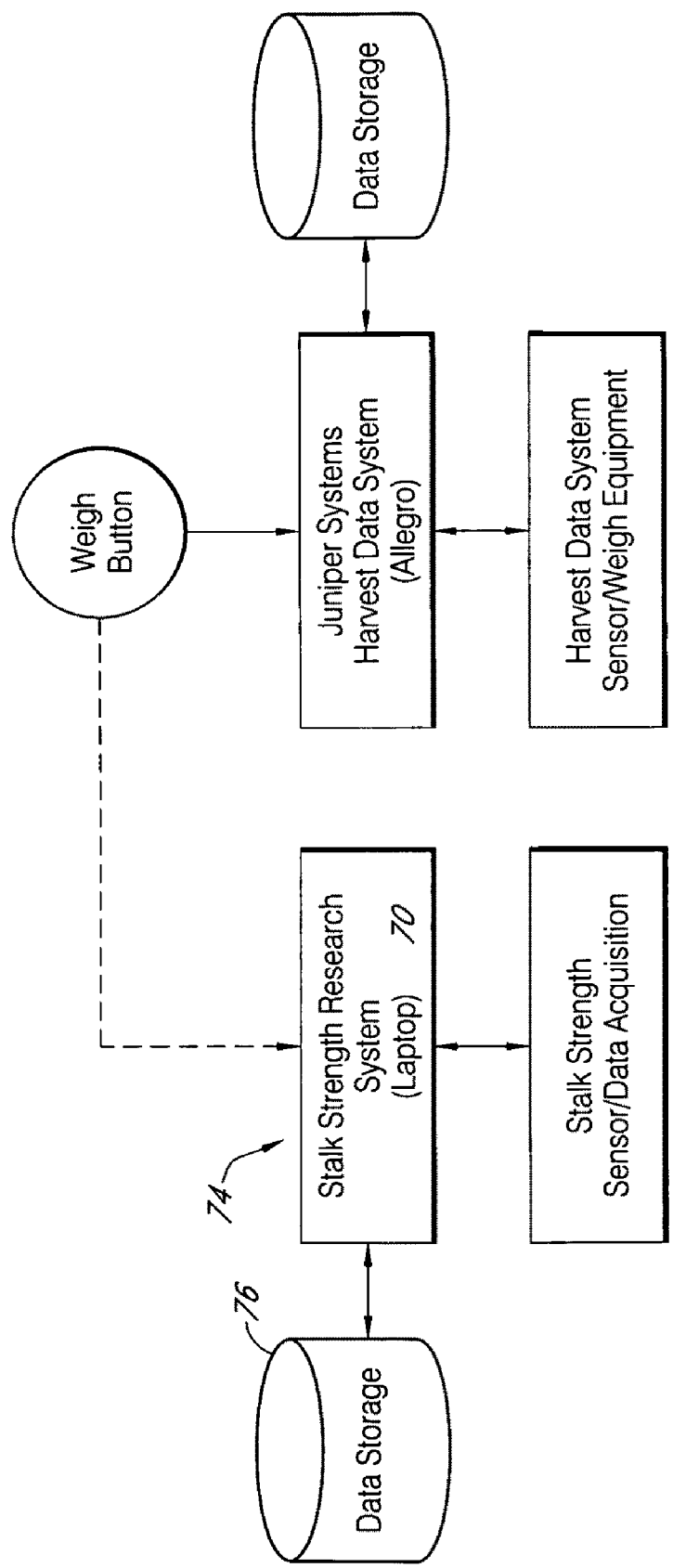
FIG. 20 is a flow chart of the data acquisition, signal processing and data storage components of an embodiment of the present invention.

A schematic 74 of these components is illustrated in FIG. 19. A USB cable 72 is used to connect the data acquisition module 68 to a digital computer or laptop 70 for processing and analysis of the digital signals. A data storage unit 76 is attached to the laptop 70 for storage of data gathered by the invention (FIG. 20).

Figure 21:
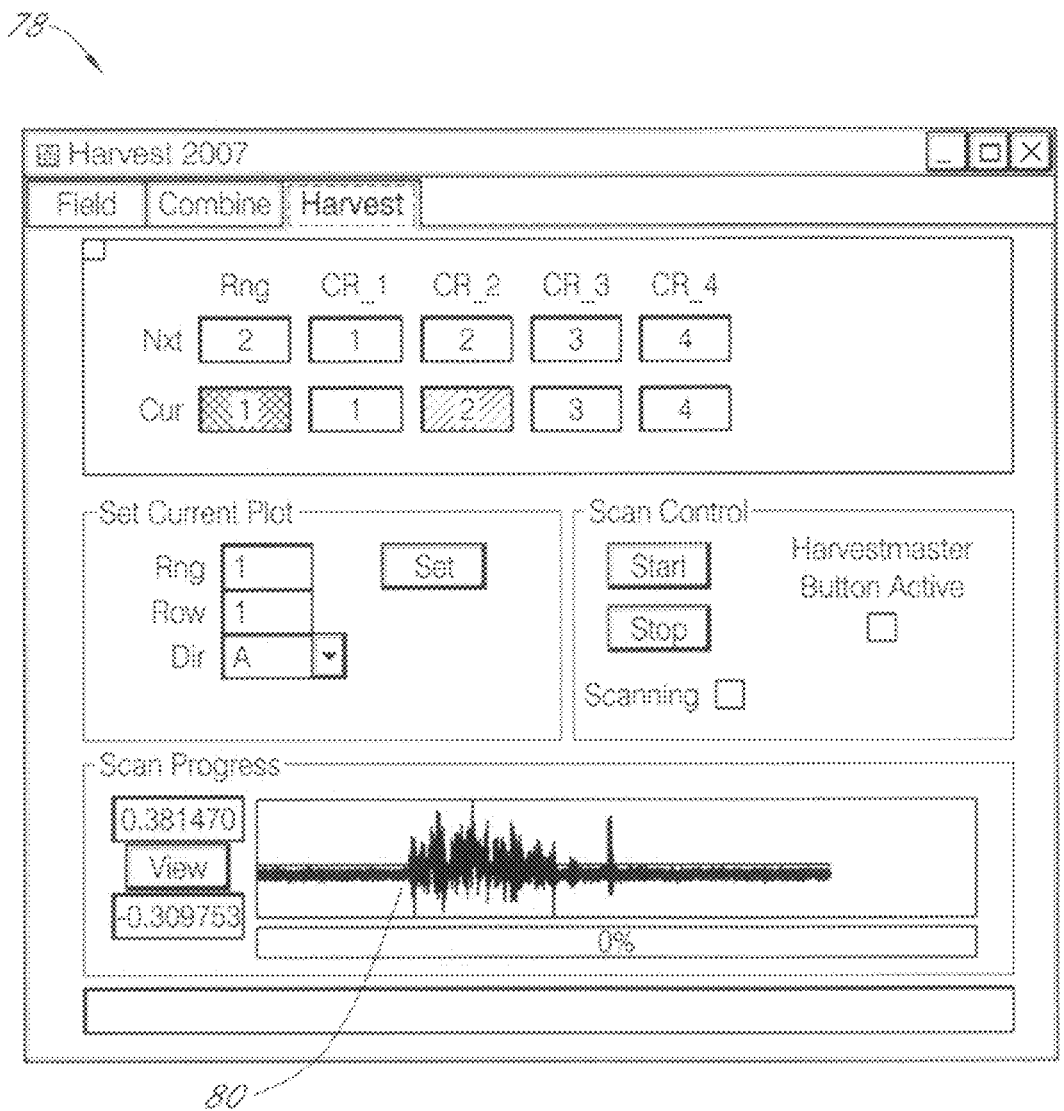
FIG. 21 is a view of a dual plot user interface of an embodiment of the present invention.
Figure 28:
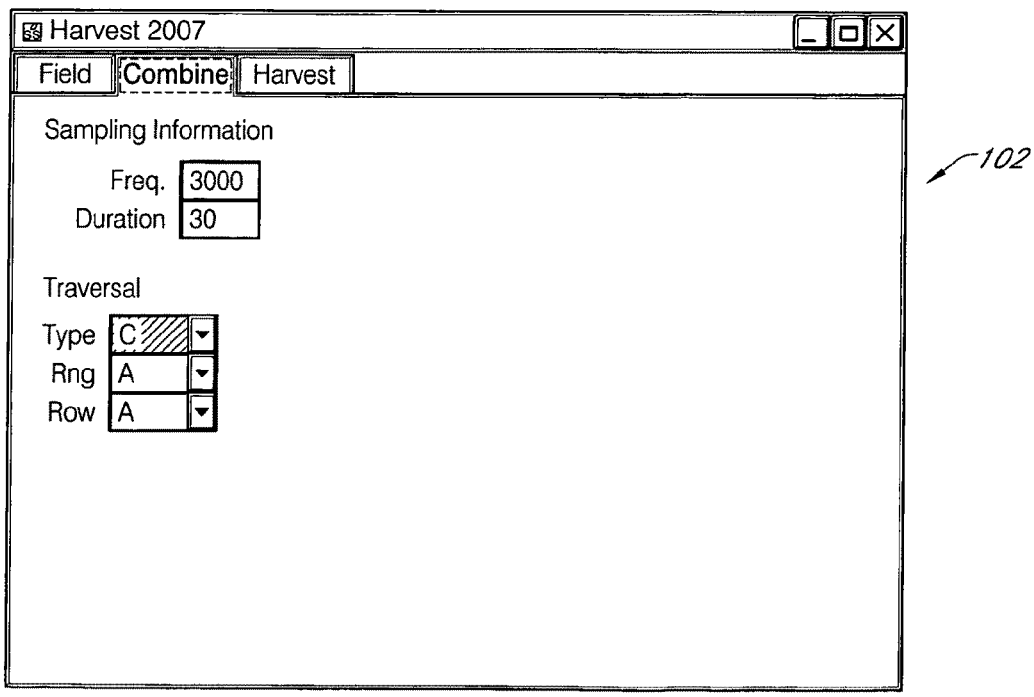
FIG. 28 is a view of a HARVEST screen of the graphical user interface.

Software on the laptop 70 includes a graphical user interface (GUI), a sample "HARVEST" screen of which is shown in FIG. 21 at 78. The signal generated by the strain gauges 56 is displayed on the graphical user interface 78, an example of which is shown in FIG. 21 at 80. The controls on the HARVEST screen 78 perform a number of functions. The top of the display informs the operator where the combine is located in range/row coordinates and where combine will be positioned next. The "Set Current Plot" controls allows the operator to define where the combine is currently located in range/row coordinates and what direction the range will be traversed ("A" for ascending, "D" for descending). The "Scan Control" is used to control the operation of the data acquisition device. At the operator's discretion, they may assert (click) the "Start" button to commence data collection. Once started, the data acquisition device will collect data as specified on the COMBINE screen. The "Stop" button allows the operator to prematurely stop the data collection. In normal operation, the harvest application starts automatically by monitoring the Harvest Master Remote Entry (HMRE) switch for closures. Every assertion of the "Start" button or HMRE switch causes the combine position to advance to the next range/row coordinate as defined in the COMBINE screen (FIG. 28). The "Scan Progress" area of the screen provides feedback to the operator concerning the status of the active data acquisition. During the scan, the progress bar displays what fraction of the scan has been performed. When a scan is complete, the collected data is displayed along with the minimum and maximum collected values. This allows the operator to discern if the collected data has a well behaved shape.

Figure 27:
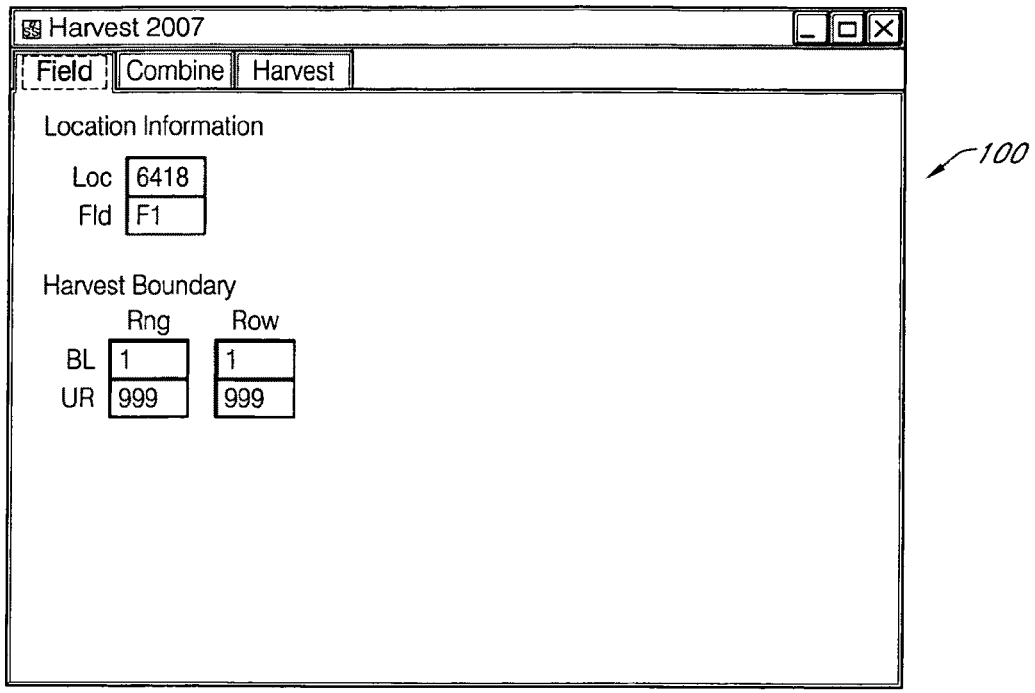
FIG. 27 is a view of a FIELD screen of the graphical user interface.

Also included in the GUI is a FIELD screen 100 (FIG. 27). Information is input on the FIELD screen 100 that provides context for the collected data. Specifically, the "loc" and "fld" represent the location and field that is being harvested. The harvest boundary defines a rectangular region using range and row coordinates in the specified location/field. A COMBINE screen 102 is also included (FIG. 28). The sampling information is used to configure the data acquisition device. Specifically, the Freq is used to set the sampling frequency and the duration defines that maximum length of time in seconds that the data acquisition device will collect data. The Traversal information defines how the combine traverses the defined field. Specifically, the type can be set for "S" or "C". "S" represents a serpentine traversal where the combine changes direction on every pass through the field. "C" represents a circular traversal where the combine direction on every pass is identical. The Rng defines the direction the combine is moving in the field. This can be set to "A" for range ascending or "D" for range descending. The Row defines the direction the combine is moving in the field. This can be set to "A" for row ascending or "D" for row descending.

Figure 22:
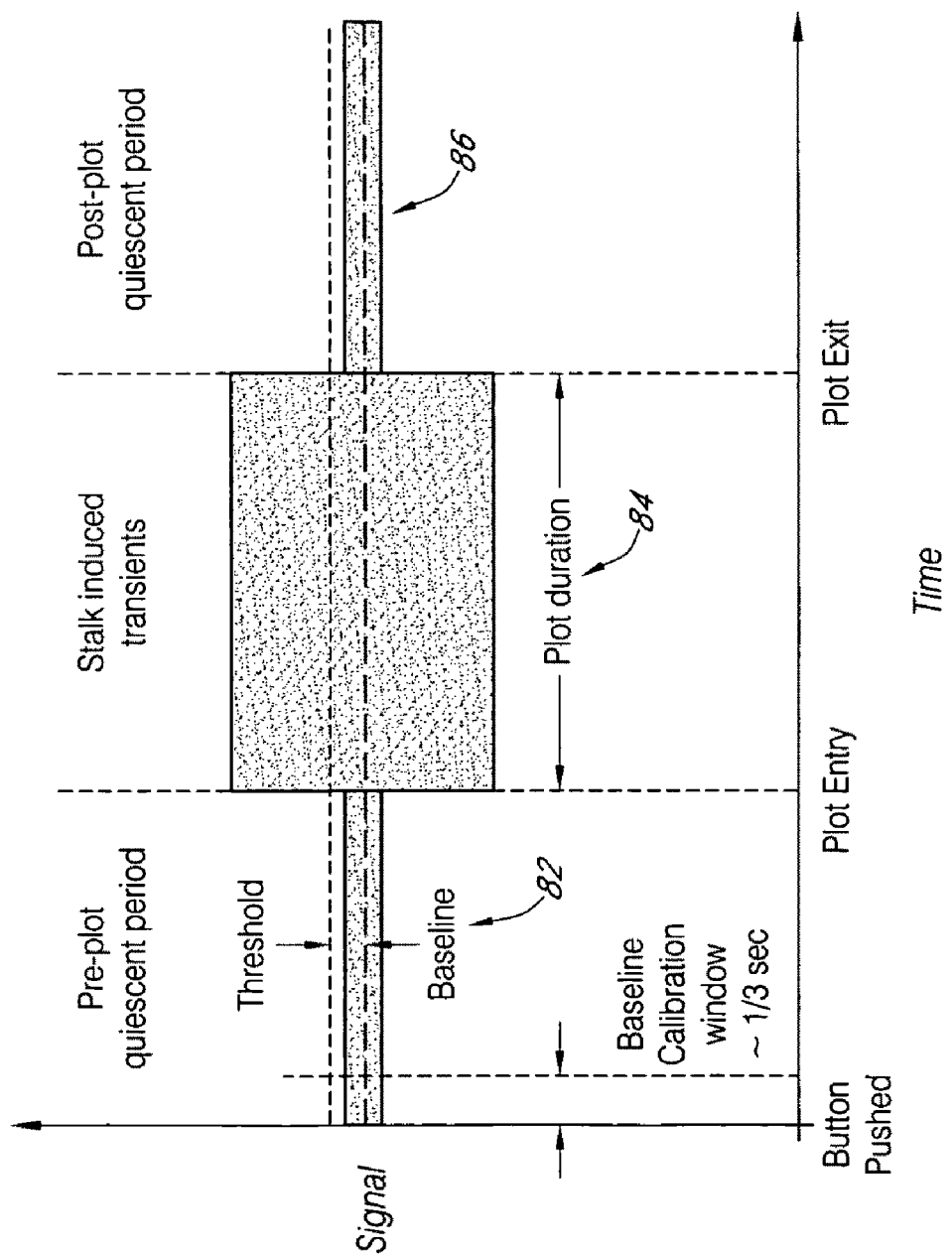
FIG. 22 is a diagrammatic view of ideal signal characteristics.
Figure 23:
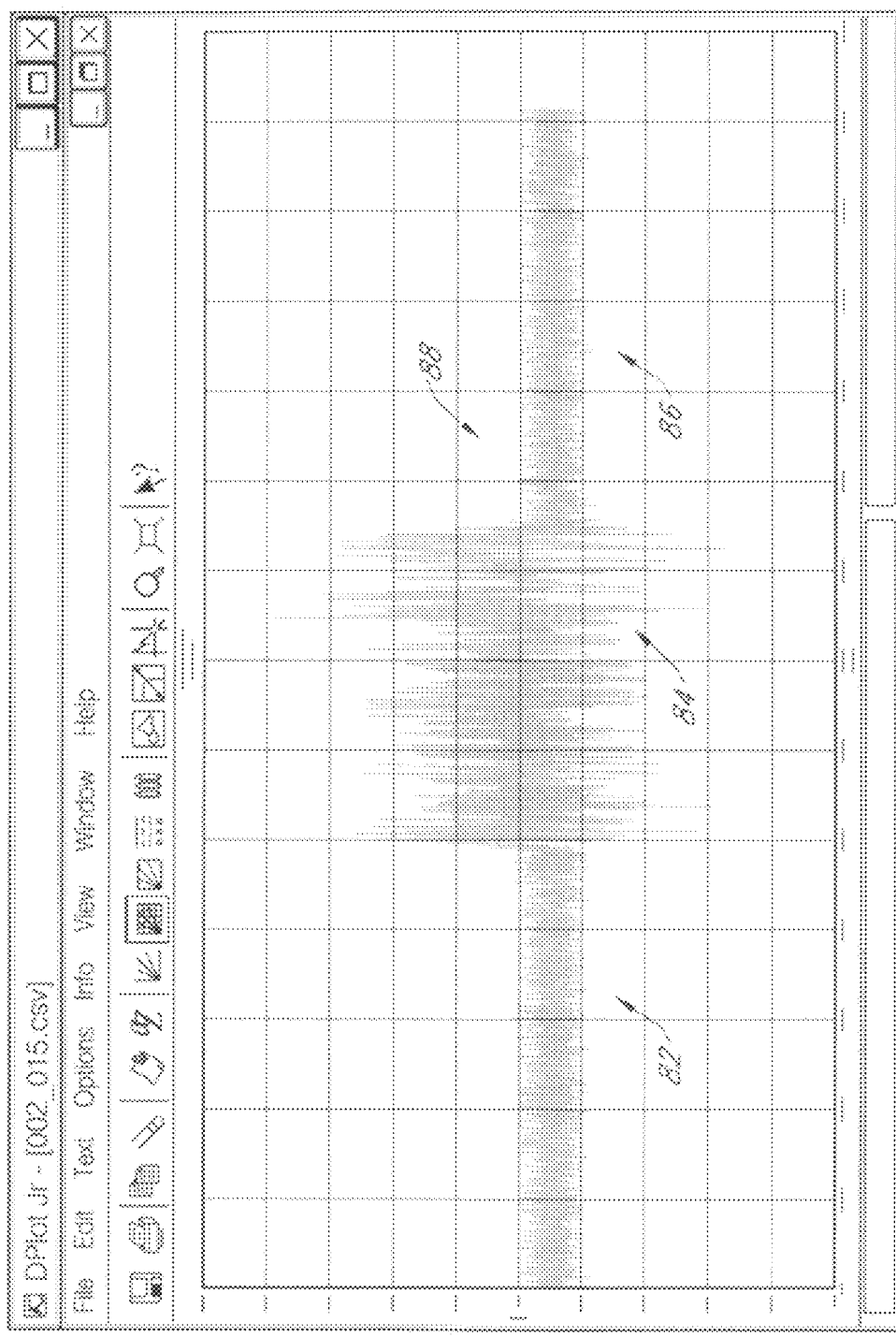
FIG. 23 is a diagrammatic view of an exemplary raw data signal generated by an embodiment of the present invention.
Figure 24:
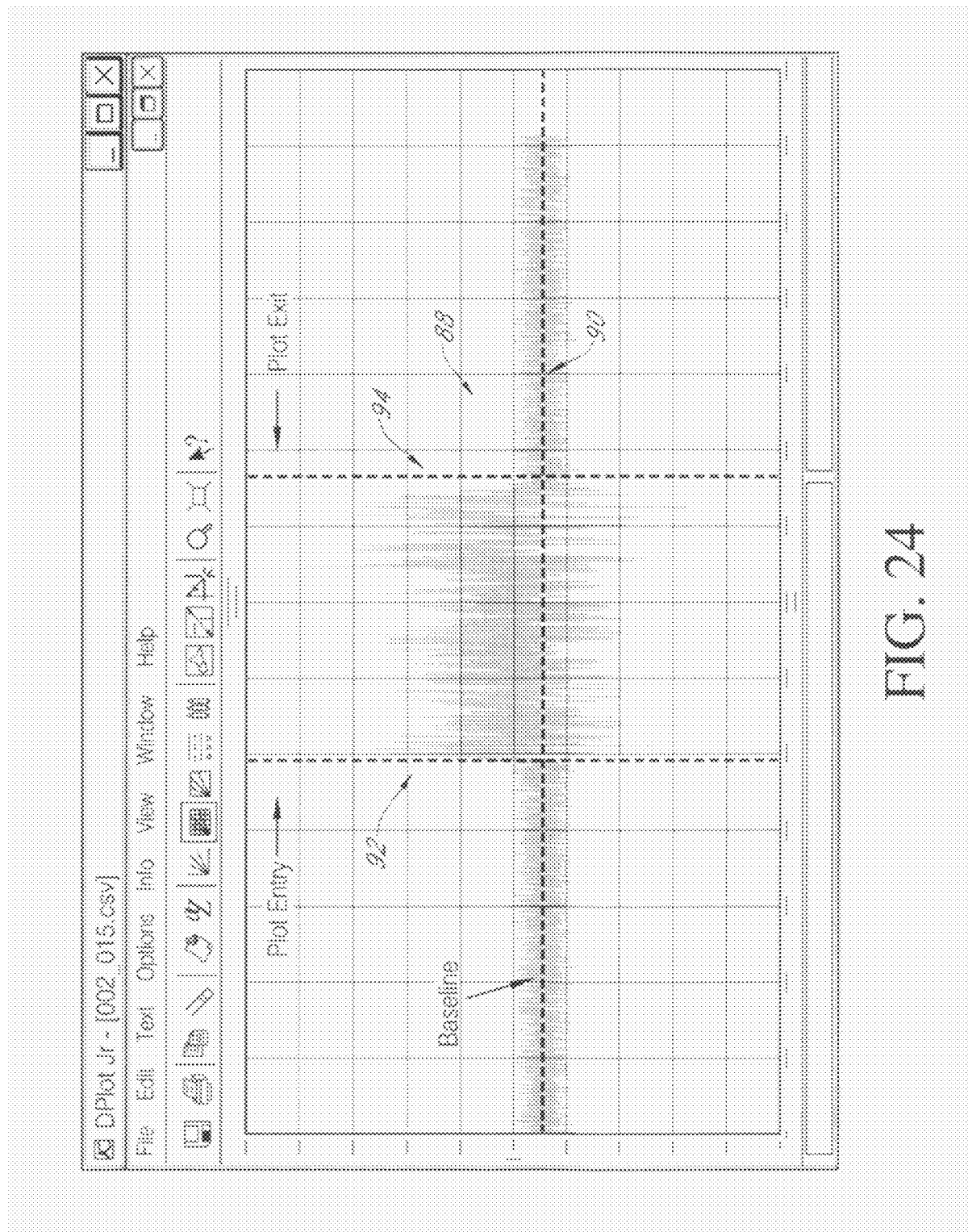
FIG. 24 is a diagrammatic view of the exemplary raw data signal generated by an embodiment of the present invention of FIG. 23 indicating the regions and features of FIG. 22.
Figure 25:
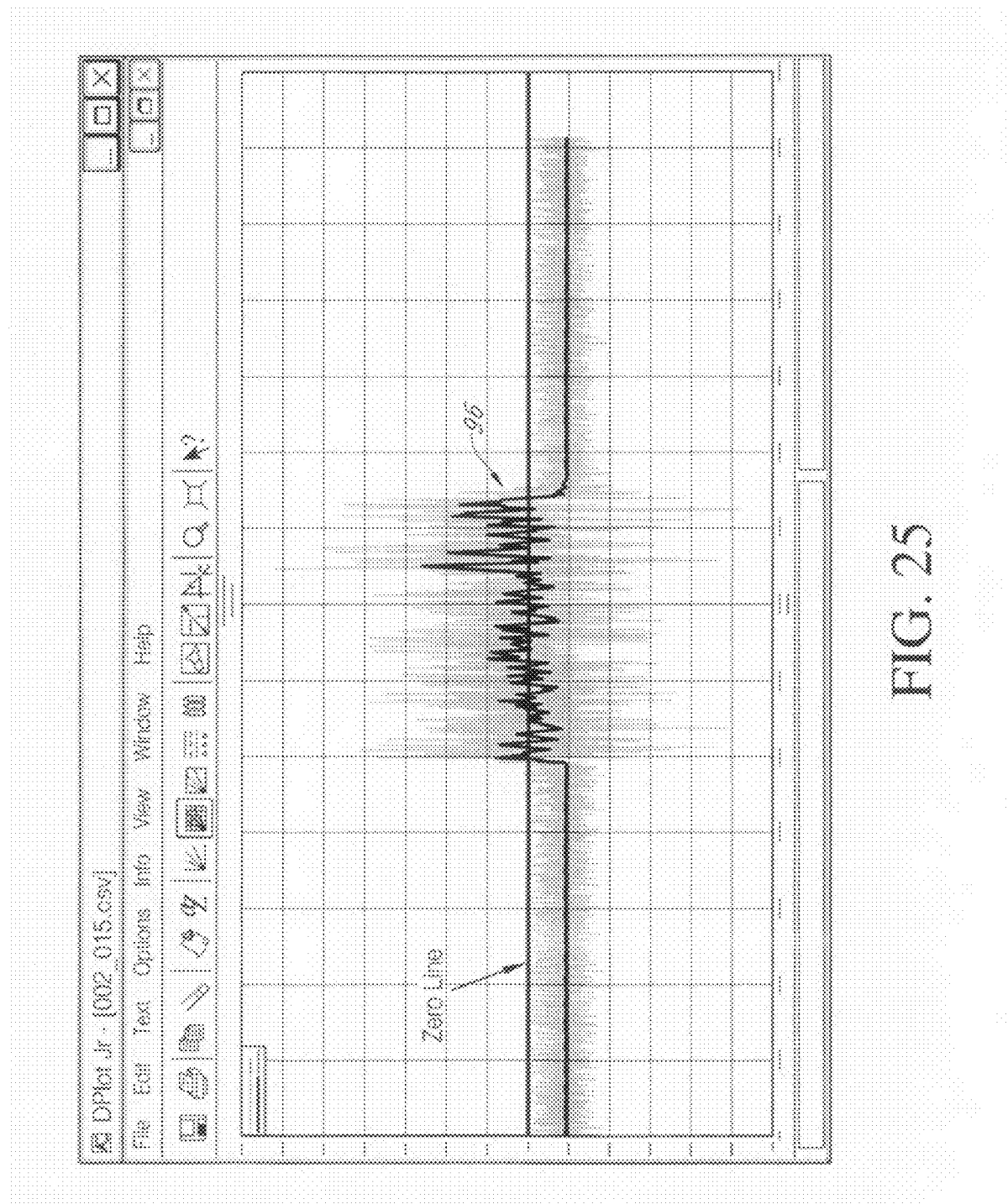
FIG. 25 is a diagrammatic view of the exemplary raw data signal generated by an embodiment of the present invention of FIG. 23 and showing an overlay of low-pass filtered data.

A signal for processing by the software having ideal characteristics is illustrated in FIG. 22. The signal includes a pre-plot quiescent period 82, a period of stalk-induced transients 84, and a post-plot quiescent period 86. The period of stalk-induced transients 84 begins at entry of the harvester 30 into the plot and ends at exit of the harvester 30 from the plot. An example of a data signal 88 generated during the pre-plot quiescent period 82, a period of stalk-induced transients 84, and a post-plot quiescent period 86 is shown in FIG. 23 which is another of the display screens that may be selected from the graphical user interface 78. The baseline 90 and the plot entry 92 and plot exit 94 times of the ideal signal are shown in FIG. 24. The signal is passed through a software algorithm that applies a low pass finite impulse response (FIR) digital filter (5 Hz; 1000 taps) to the raw data signal, generating the filtered signal 96 shown in dark line in FIG. 25. The software also takes an average of the raw data signal every 1000 samples.

Figure 26:
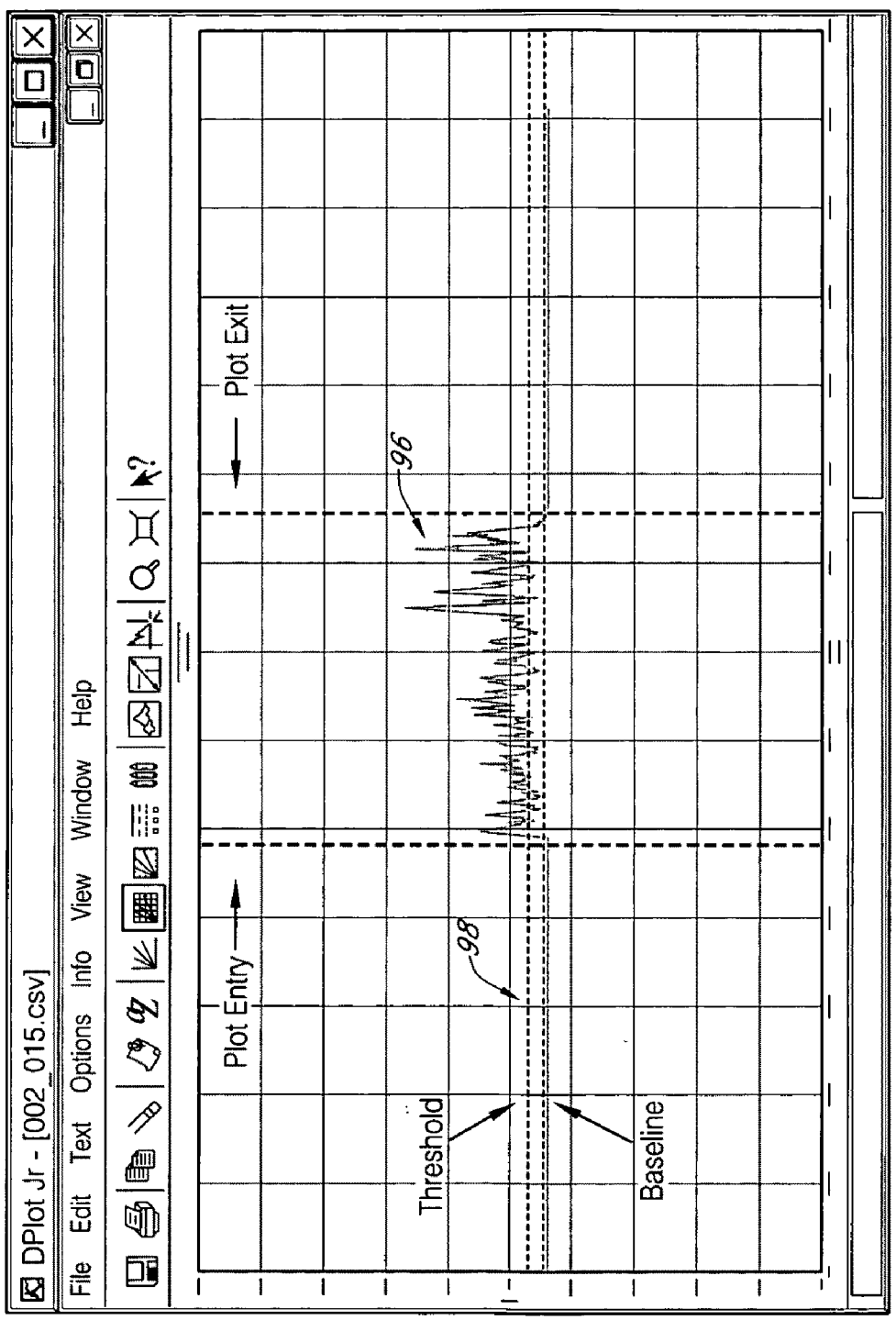
FIG. 26 is a diagrammatic view of the low-pass filtered data of FIG. 25.

The filtered signal 96 is displayed by itself in FIG. 26. The software allows a user to set a threshold 98 below which no data will be taken. The threshold 98 is set above the baseline by an amount that is above most of the baseline noise but which also is below most of the data in the filtered signal. Where the threshold 98 crosses the filtered signal on the left is defined as "plot entry" and where it crosses on the right is defined as "plot exit". Only data between "plot entry" and "plot exit" and above the threshold 98 is collected and analyzed.

The present invention thus gathers data representative of the average stalk strength of corn plants harvested from a particular plot and stores that data for subsequent analysis and use. For example, the present invention is particularly useful in corn hybrid breeding programs where breeding decisions may be based, at least in part, on the stalk strength of particular experimental or research hybrids under consideration.

The present invention may also be used to detect gaps of plants in the rows of a plot being harvested when there is no signal indicative of plant stalks being crushed for a period of time. By using the present invention with a GPS device whereby the data being collected is associated with a geographical location, the length and location of the gap can be determined. Another application of the present invention when used with a GPS device is the calculation of a "fill ratio" which represents how uniformly the plants are distributed in a plot being harvested.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

We claim:

1. Apparatus for measuring stalk strength of a plant, comprising:
   (a) a stalk roll that is rotated to engage and crush the plant stalk; and
   (b) means for measuring the force exerted on the stalk roll by the plant stalk in resistance to crushing by the stalk roll.

2. The apparatus of claim 1, wherein a device constructed to measure comprises at least one of a force or movement sensor and further comprising a signal generated by said sensor and a digital computer for analyzing the signal.

3. A method of selecting corn plants with enhanced stalk strength, comprising the steps of:
(a) planting corn plants;
(b) measuring a force exerted by said corn plants stalks against stalk crushing automatically while harvesting the corn plants;
(c) analyzing the force data for stalk strength; and
(d) selecting corn plants with enhanced stalk strength.

4. A method according to claim 3 wherein selecting corn plants with enhanced stalk strength includes the step of deselecting plants without enhanced stalk strength.

5. A method according to claim 3 wherein at least one strain gauge is employed in measuring said force.

6. A method according to claim 3 including the step of further selecting from progeny plants produced from the seed from said selected corn plant.

7. A method according to claim 6 wherein said selected progeny plants are used in steps (b), (c), and (d) for additional selection for stalk strength.

8. A method of detecting plant stalk force levels, the method comprising the steps of:
engaging stalks with a plant harvesting apparatus comprising a stalk engaging device constructed for crushing the plant stalk; and
detecting the force level being exerted by a plant stalk in resistance to crushing.

9. The method of claim 8 further comprising the step of establishing a force level that indicates a plant stalk was present to exert a force.

10. The method of claim 9 further comprising the step of detecting a gap of plants in a row being harvested wherein when the detected force level is below the established force level indicative of plant stalks being crushed for greater than an established length of time.

11. The method of claim 10 further comprising the step of determining the length and location of the gap with a GPS device whereby the data being collected is associated with a geographical location.

12. The method of claim 11 further comprising the stop of determining with said GPS data a fill ratio which represents how uniformly the plants are distributed.

13. The method of claim 9 further comprising the step of analyzing the detected force levels to generate data corresponding to the location of individual plants.

14. The method of claim 13 further comprising the step of analyzing the location of individual plants to determine the distribution of plants.

15. The method of claim 14 further comprising the step of analyzing the distribution of plants to determine the presence of a gap in the plants.

16. The method of claim 15 further comprising the step of analyzing the distribution of plants to determine the length of the gap.

17. The method of claim 15 further comprising the step of analyzing the distribution of plants with a GPS device to determine the location of the gap.

18. The method of claim 13 further comprising the step of determining a fill ratio which represents how uniformly the plants are distributed.

* * * * *